US005766763A

United States Patent [19]

Kurisu et al.

[11] Patent Number: 5,766,763
[45] Date of Patent: Jun. 16, 1998

[54] HEXAGONAL SYSTEM FERRITE POWDER FOR A HIGH DENSITY MAGNETIC RECORDING MEDIUM

[75] Inventors: Shunji Kurisu; Osamu Kubo; Tatsumi Maeda; Etsuji Ogawa, all of Yokohama, Japan

[73] Assignee: Kabushiki Kaisha Toshiba, Kawasaki, Japan

[21] Appl. No.: 701,403

[22] Filed: Aug. 22, 1996

Related U.S. Application Data

[63] Continuation of Ser. No. 190,927, Feb. 3, 1994, Pat. No. 5,576,114.

[30] Foreign Application Priority Data

Feb. 4, 1993 [JP] Japan .................. 5-017137

[51] Int. Cl.⁶ .................. G11B 5/66; G11B 5/70
[52] U.S. Cl. .............. 428/403; 428/694 B; 428/694 BH; 428/694 BA; 428/900; 252/62.56; 252/62.63; 252/62.59; 252/62.58; 148/100; 148/105
[58] Field of Search .................. 428/694 B, 694 BH, 428/694 BA, 403, 900; 252/62.56, 62.63, 62.59, 62.58; 148/100, 105

[56] References Cited

U.S. PATENT DOCUMENTS

| | | | |
|---|---|---|---|
| 4,267,203 | 5/1981 | Motz et al. | 427/48 |
| 4,539,129 | 9/1985 | Nagai et al. | 252/62.63 |
| 4,552,808 | 11/1985 | Fujiyama et al. | 428/328 |
| 4,740,419 | 4/1988 | Asai et al. | 428/323 |
| 4,781,981 | 11/1988 | Katamoto et al. | 428/403 |
| 5,077,146 | 12/1991 | Kubo et al. | 428/694 |
| 5,118,575 | 6/1992 | Maekawa et al. | 428/403 |
| 5,576,114 | 11/1996 | Kwisu et al. | 428/694 B |

FOREIGN PATENT DOCUMENTS

| | | |
|---|---|---|
| A-0 010689 | 10/1979 | European Pat. Off. . |
| A-0 102819 | 8/1983 | European Pat. Off. . |
| A-2 372500 | 11/1977 | France . |
| A-15 71622 | 4/1963 | Germany . |
| 55-161883 | 12/1980 | Japan . |
| 58-127777 | 7/1983 | Japan . |

OTHER PUBLICATIONS

"Packing Property of Barium Ferrite Powder for Use in Magnetic Recording Medium", '92 Internatioanl Conference on Colour Materials, pp. 130–131, Nov. 1992, with English abstract 3A–15, p. 203.

*Primary Examiner*—Daniel Zirker
*Attorney, Agent, or Firm*—Finnegan, Henderson, Farabow, Garrett & Dunner, L.L.P.

[57] ABSTRACT

A magnetic powder is disclosed which is characterized by possessing a powder compression characteristic such that the magnetic powder, after being packed in a closed container, pressed at a load of 400 kgf/cm³, and relieved of the load, exhibits a packing density in the range of 2.5 to 3.5 g/cm³ and a geometric standard deviation of not more than 1.5 in the particle diameter distribution. A magnetic recording medium using the magnetic powder mentioned above has high packing and, consequently, secures high output, and has ample diminution of noise.

6 Claims, No Drawings

HEXAGONAL SYSTEM FERRITE POWDER FOR A HIGH DENSITY MAGNETIC RECORDING MEDIUM

This application is a continuation of application Ser. No. 08/190,927, filed Feb. 3, 1994, now issued U.S. Pat. No. 5,576,114.

BACKGROUND OF THE INVENTION

1. Field of the Invention

This invention relates to a magnetic powder and a magnetic recording medium using the magnetic powder.

A magnetic recording medium of the type which is produced by the application of a coat is composed of a supporting substrate made of a nonmagnetic material such as polyethylene terephthalate and a magnetic layer formed mainly of a magnetic powder and a binder resin and superposed on the supporting substrate.

The magnetic powders heretofore used for magnetic recording media include needle like magnetic powders such as of $\gamma\text{-Fe}_2\text{O}_3$, Co-coated $\gamma\text{-FeO}_3$, Co-doped $\gamma\text{-Fe}_2\text{O}_3$, Co-coated $\text{Fe}_3\text{O}_4$, and metallic Fe, for example. For the magnetic recording media using these needle like magnetic powders, the longitudinal magnetic recording method utilizing the magnetization which is effected in the longitudinal direction relative to the surface of a magnetic layer has been adopted.

This longitudinal magnetic recording method, however, has proved unfit for high-density recording and reproducing because the effect of a demagnetized field becomes more conspicuous in proportion as the recording density increases.

In recent years, therefore, the perpendicular magnetic recording method utilizing the magnetization which is effected in the perpendicular direction relative to the surface of a magnetic layer has been proposed. This perpendicular magnetic recording method may well be regarded as optimal for high-density recording because this magnetization gains stability as the recording density increases.

As magnetic recording media fit for this perpendicular magnetic recording method, increase magnetic recording media which are obtained by depositing a Co—Cr alloy on a supporting substrate, for example, by a vacuum technique such as the vacuum deposition method or the sputtering method and the magnetic recording media which are obtained by applying a hexagonal system ferrite powder having an axis of easy magnetization in a direction perpendicular to a surface together with a binder resin to a supporting substrate have been known.

The magnetic recording media which are produced by the vacuum technique have various problems pertaining to ability to withstand weather conditions, capability of mass production, and production cost, whereas the magnetic recording media which are produced by the coating technique have great promise of success and are attracting attention because they allow ready use of conventional manufacturing facilities and, what is more, excel in capability of mass production.

As specific examples of the hexagonal system ferrite powder which is used for the magnetic recording media of the coating type, M type $\text{BaFe}_{12}\text{O}_{19}$, W type $\text{BaMe}_2\text{Fe}_{16}\text{O}_{27}$ (wherein Me stands for a divalent metal element), hexagonal system ferrite powders resulting from substitution of part of the atoms by atoms of other elements, M type and W type composite powders, and M type and Spinel composite powders may be cited.

For the production of these magnetic powders, various methods including the glass crystallization method, the hydrothermal synthetic method, the coprecipitation method, and the flux method have been proposed.

For allowing a large volume of information to be recorded and reproduced, the magnetic recording media are desired to be capable of recording the information at a still higher density. With a view to realizing such a magnetic recording medium, the desirability of developing a method which allows high packing of magnetic powder and consequently enjoys increase output and diminished noise has been finding growing recognition.

None of the magnetic powders developed to date, however, is capable of attaining the high packing and further fulfilling the diminution of noise.

SUMMARY OF THE INVENTION

This invention, produced in view of coping with the problems mentioned above, has for its object the provision of a magnetic powder which is capable of allowing particularly high packing and further fulfilling diminution of noise and a magnetic recording medium which uses the magnetic powder and attains exaltation of output and diminution of noise and further permits high-density recording.

The magnetic powder of this invention is characterized by possessing a powder compression characteristic such that the magnetic powder, after being packed in a closed container, pressed at a load of 400 kgf/cm$^3$, and relieved of the load, exhibits a packing density in the range of 2.5 to 3.5 g/cm$^3$ and a geometric standard deviation of not more than 1.5 in the particle diameter distribution.

The magnetic recording medium of this invention comprises a supporting body and a magnetic layer formed on the supporting body. The magnetic layer is substantially composed of a magnetic powder and a binder. The magnetic powder contained in the magnetic layer possesses a powder compression characteristic such that the magnetic powder, after being packed in a closed container, pressed under a load of 400 kgf/cm$^2$, and relieved of the load, exhibits a packing density in the range of 2.5 to 3.5 g/cm$^3$ and a geometric standard deviation of not more than 1.5 in particle diameter distribution. The magnitude of saturation magnetization (Ms) per unit volume of the aforementioned magnetic layer is not less than 95% of the magnitude of theoretical saturation magnetization (Ms'). The term "theoretical saturation magnetization (Ms')" as used herein refers to the value of the saturation magnetization which would exist if no voids occur between the magnetic powder and the binder in the magnetic layer.

The magnetic recording medium of this invention comprises a supporting body and a magnetic layer containing a magnetic powder and formed on the supporting body. The magnetic powder mentioned above possesses a powder compression characteristic such that the magnetic powder, after being packed in a closed container, pressed at a load of 400 kgf/cm$^3$, and relieved of the load, exhibits a packing density in the range of 2.5 to 3.5 g/cm$^3$ and a geometric standard deviation of not more than 1.5 in the particle diameter distribution. Further, the magnetic recording medium has a squareness ratio of not less than 0.80 (after compensation of demagnetizing field) in the vertical or longitudinal direction.

The present inventors have made a diligent study with a view to solving the technical problems mentioned above and have found consequently that when a magnetic powder possesses a powder compression characteristic such that the magnetic powder, after being packed in a closed container, pressed at a load of 400 kgf/cm$^3$, and relieved of the load, exhibits a packing density in the range of 2.5 to 3.5 g/cm$^3$ and a geometric standard deviation of not more than 1.5 in the particle diameter distribution, this magnetic powder allows high packing, attains increased output and diminished noise, and permits production of a magnetic recording medium capable of high-density recording.

As specific examples of the magnetic powder effectively usable in this invention, M type $BaFe_{12}O_{19}$, W type $BaMe_2Fe_{16}O_{27}$ (wherein Me stands for a divalent metal element), hexagonal system ferrite powders resulting from substitution of part of the atoms by atoms of other elements, M type and W type composite powders, and M type and Spinel composite powders may be cited. The basic components of the hexagonal system ferrite are at least one member selected from the group of BaO, SrO, CaO, and PbO and $Fe_2O_3$. The component for fulfilling the role of improving such characteristics as control of coercive force and saturation magnetization is at least one element selected from the group consisting of Co, Ni, Cu, Zn, Ti, Mg, Nb, Sn, Zr, V, Cr, Mo, Al, Ge, and W.

Among other conceivable hexagonal system ferrites, the hexagonal system ferrites represented by the chemical formula, $AO \cdot n(Fe_{12-x-y}M1_xM2_yO_{18-\delta})$ prove particularly desirable. In the formula, A stands for at least one element selected from the group consisting of Ba, Sr, and Ca, M1 for at least one element selected from the group of divalent elements, M2 for at least one element selected from the group of tetravalent to hexavalent elements, δ for a value represented by [x+(3−m)y]/2 (wherein m stands for the average valency of M2), n for a number of not less than 0.8 and not more than 3.0, x or y for a number of at least 0, x for a number of not more than 3, and y for a number of not more than 2. It is particularly effective to use as M1 at least one element selected from the group consisting of Co, Zn, and Ni.

As indexes for indicating the characteristics of a magnetic powder, the size of magnetic powder, the plate shape ratio (average diameter D of particle/average thickness t of particle) of hexagonal system ferrite powder, and the specific surface area of powder have been heretofore accepted. The present inventors have paid attention particularly to the particle diameter distribution of magnetic powder and the compression characteristic of particles.

The magnetic powder mentioned above must, as a powder, exhibit a geometric standard deviation of not more than 1.5 in the particle diameter distribution of magnetic powder. In other words, the magnetic powder must possess a highly uniform particle diameter distribution. It has been ascertained to the inventors, however, that if a given magnetic powder possesses a uniform particle diameter distribution such as to exhibit a geometric standard deviation of not more than 1.5, it does not always follow that this magnetic powder attains low noise and high packing.

The geometric standard deviation which indicates the particle diameter distribution mentioned above is calculated based on the numerical values of particle diameter obtained from an electron micrograph of a given magnetic powder.

Namely, the geometric standard deviation is calculated from the straight line written in a logarithmico-normal probability paper in which an axis of abscissas indicates a particle diameter and an axis of ordinates indicates a integrated value, based on the following expression:

geometric standard deviation=(under 84.4% particle diameter)/50% particle diameter.

The packing density of magnetic powder in a compressed state is counted among the indexes which indicate the characteristics of magnetic powder. In the article titled "Packing Property of Barium Ferrite Powder for Use in Magnetic Recording Medium" and inserted at pages 130 and 131 in the Collection of Papers for presentation at the "'92 International Conference on Colour Materials" held in November, 1992, for example, the importance of packing density of a magnetic powder in a compressed state is demonstrated.

The present inventors, therefore, have continued a study on the packing density of magnetic powder in a compressed state in addition to the aforementioned geometric standard deviation of particle diameter distribution of magnetic powder with a view to elucidating the relation between the packing density of magnetic powder in a compressed state and the magnitude of pressure used for a compression. As a results, it has been determined that the density of a magnetic powder compressed at a load of less than 300 kgf/cm$^2$ has a relatively low correlation with the actual magnetic powder in the magnetic recording medium, because this pressure on the magnetic powder is smaller than the pressure exerted in the process such as calender treatment.

Further, as mentioned in the above document, when the pressure was more than 500 kgf/cm$^2$, it has been ascertained that the state of the compressed magnetic powder may be different from that of the actual magnetic powder in the magnetic recording medium, because a part of magnetic particles in a magnetic powder may be broken at a pressure of more than 500 kgf/cm$^2$. The reason of this breaking of the magnetic particles may be based on the shape and size thereof.

They have continued an experiment using more widely varied pressure and consequently acquired a novel knowledge that the packing density of a magnetic powder compressed under a load of 400 kgf/cm$^2$ bears greatly on the state of presence of the magnetic powder in the magnetic recording medium.

The magnetic layer is produced by preparing a composite material consisting of inorganic particles such as abrasive and macromolecular materials such as lubricant and binder resin in addition to a magnetic powder and compressing the composite material as by the calendering treatment. The magnetic layer obtained by the procedure described above is considered to assume a state very similar to the state which the magnetic powder assumes after being compressed particularly at a load of 400 kgf/cm$^2$. This state of the magnetic layer is believed to be well correlated with the state of true presence of the magnetic powder in the magnetic layer.

Further, it has been experimentally ascertained that the essential requirement for the accomplishment of low noise and high packing mentioned above resides not in the fact that the packing density of a compressed powder is merely high but in the fact that the packing density is particularly in the range of 2.5 to 3.5 g/cm$^3$.

The reason for the aforementioned specific range imposed on the density of the compressed magnetic powder mentioned above is as follows. In the case of a given magnetic powder which happens to show a geometric standard deviation of not more than 1.5 in particle diameter distribution, if this magnetic powder has a density of not less than 3.5 g/cm$^3$ and, therefore, the individual particles thereof are very easily compacted under a compressive force, the magnetic powder suffers a decrease in dispersibility and fails to attain diminution of noise, improvement of surface property, and exaltation of output probably because of strong cohesive force produced between the individual particles. Conversely, if a magnetic powder in a compressed state has a density of not more than 2.5 g/cm$^3$ and, therefore, the individual particles thereof are not easily compacted under a compressive force, this magnetic powder attains high packing in a magnetic recording medium only with great difficulty and induces a decrease in output.

Incidentally, the packing density of a magnetic powder in a compressed state as referred to in the present specification is to be calculated as follows. This density of a given magnetic powder is determined by first placing 50 mg of the magnetic powder as a sample in a container made of stainless steel and having a diameter of 4 mm, compressing the sample in the container under a load of 400 kgf/cm$^2$, relieving the sample of the load, measuring the thickness of the compressed sample, and using the found thickness for calculation of the density under discussion.

As already mentioned, M type $BaFe_{12}O_{19}$, W type $BaMe_2Fe_{16}O_{27}$ (wherein Me stands for a divalent metal element), hexagonal system ferrite powders resulting from substitution of part of the atoms by atoms of other elements, M type and W type composite powders, and M type and Spinel composite powders may be cited as concrete examples of the magnetic powder which is effectively usable in this invention. Among other conceivable hexagonal system ferrites, the hexagonal system ferrites represented by the chemical formula, $AO \cdot n(Fe_{12-x-y}M1_xM2_yO_{18-\delta})$ prove particularly desirable. In the formula, A stands for at least one element selected from the group consisting of Ba, Sr, and Ca, M1 for at least one element selected from the group of divalent elements, M2 for at least one element selected from the group of tetravalent to hexavalent elements, δ for a value represented by $[x+(3-m)y]/2$ (wherein m stands for the average valency of M2), n for a number of not less than 0.8 and not more than 3.0, x or y for a number of at least 0, x for a number of not more than 3, and y for a number of not more than 2.

The uses to be found for the magnetic powder of this invention are not particularly limited. When the magnetic powder is used particularly for the magnetic recording medium, however, it is required to be magnetically stable. For ensuring this magnetic stability, the magnetic powder is desired to have an average particle diameter in the approximate range of 20 to 300 nm and a specific surface area of hexagonal system ferrite powder in the range of 20 to 60 m$^2$/g. The reason for this particular range is that the specific surface area of less than 20 m$^2$/g induces and increase of noise, and the specific surface area of not less than 60 m$^2$/g prevents and uniform dispersion of magnetic powder and degrades magnetic characteristics thereof. Particularly, it is preferably desired that the specific surface area of hexagonal system ferrite powder is in the range of 30 to 50 m$^2$/g.

Further, a plate shape ratio of hexagonal system ferrite powder is desired in the range of 2 to 5 in consideration of the degradation of magnetic characteristics produced by stacking of magnetic particles and the orientation property of magnetic particles. The coercive force of the magnetic powder is desired to be adjusted to fall in the range of 200 to 2500 Oe. The reason for this particular range is that a magnetic heads magnetic field reaches saturation during the course of recording if the coercive force is unduly high and the retention of recording signal is not attained if the coercive force is unduly low.

Incidentally, for the production of the magnetic powder of this invention, various well-known methods such as, for example, the glass crystallization method, the hydrothermal synthetic method, the coprecipitation method, and the flux method can be used.

In order to control both the geometric standard deviation and the packing density within the ranges of the present invention, it is desirable to use the glass crystallization method comprising the steps of melting glass components with material components for the magnetic powder, rapidly quenching the resulted melt to form an amorphous substance, sintering the amorphous substance and removing the glass components. Particularly it is desirable to use natrium (Na) as a glass component for controlling the packing density.

However, it is important to properly control temperatures for melting and sintering and to appropriately select the material components. Thus, it is possible to obtain the magnetic powder having the specified ranges of the geometric standard deviation and the packing ratio by comprehensively controlling these conditions.

The magnetic recording medium of this invention is enabled to attain high output and low noise by using the magnetic powder described above and, at the same time, constructing the magnetic layer for use in the magnetic recording medium in such a manner that the ratio of the saturation magnetization (Ms) per unit volume thereof to the theoretical saturation magnetization (Ms') of the medium (Ms/Ms') is not less than 95%. The saturation magnetization (Ms) per unit volume as referred to herein means the saturation magnetization which is actually measured of the magnetic recording medium using the magnetic powder under discussion. The theoretical saturation magnetization (Ms') as referred to herein means the saturation magnetization which is theoretically calculated from the components of the magnetic layer,that is, which would exist if no voids occur between the binder and magnetic power in the magnetic layer. The reason for the difference between the actual saturation magnetization (Ms) and the theoretical saturation magnetization (Ms') resides in the fact that the magnetic layer actually contains such extraneous matter as voids besides the essential components thereof. The statement that the actual saturation magnetization is not less than 95% of the theoretical saturation magnetization implies that the magnetic recording medium of this invention contains very few voids therein and, therefore, the packing ratio of magnetic powder in the magnetic recording medium is substantially improved.

The magnetic recording medium of this invention is enabled to acquire generously improved properties particularly in the high band or low band by using the aforementioned magnetic powder and, at the same time, particularly having a squareness ratio (after compensation of demagnetizing field) in the vertical or longitudinal direction exalted to a level exceeding 80%. For the sake of attaining such a high orientation, the procedure of first applying a magnetic coating material to a substrate and then allowing the applied layer of the magnetic coating material to dry while applying an oriented magnetic field thereto proves particularly effective.

As the binder to be used simultaneously with the magnetic powder in the magnetic layer of the magnetic recording medium of this invention, any of various well-known binder resins can be used. Particularly, those binder resins which amply contain such polar groups as sulfon group, hydroxyl group, and carboxyl group function highly effectively in thoroughly dispersing minute magnetic particles.

As a matter of course, such well-known additives as abrasive, antistatic agent represented by carbon, and other similar agents may be added simultaneously with the binder resin to be mixed with the magnetic powder.

DESCRIPTION OF THE PREFERRED EMBODIMENTS

Now, this invention will be described more specifically below with reference to working examples.

EMBODIMENT 1

As a starting material, 31.35 mol % of $B_2O_3$, 26.68 mol % of BaO, 5.0 mol % of $Li_2O$, 5.0 mol % of $Na_2O$, 27.33 mol % of $Fe_2O_3$, 2.21 mol % of CoO, 1.50 mol % of ZnO, and 0.93 mol % of $Nb_2O_5$ were thoroughly dry mixed and then calcined at 720° C. The resultant calcined composite was further mixed thoroughly and then fused by high frequency heating at 1250° C. Then, the produced melt was thoroughly stirred, dropped between twin rolls, and quench rolled. The quench rolled ribbon was heat-treated at 730° C. to form a Ba ferrite. Finally, the heat-treated substance was washed to extract the Ba ferrite and dried to afford a magnetic powder. The extraction of the Ba ferrite in this case was carried out by placing 1 part of the heat-treated substance and 1 part of acetic acid and 50 parts of water in a stainless steel container, stirring them and meantime keeping them exposed to ultrasonic wave for 24 hours, and washing the resultant mixture repeatedly with water until the pH was saturation.

The magnetic powder was pressed under a load of 400 kgf/cm². The magnetic powder in a compressed state was found to have a packing density of 2.8 g/cm³, a geometric standard deviation of 1.42, a specific surface area (determined by the BET method) of 37 m²/g, a coercive force (determined by the use of a sample shaking type magnetometer) of 1350 Oe, and a saturation magnetization of 60 emu/g.

EMBODIMENT 2

As a starting material, 31.35 mol % of $B_2O_3$, 21.01 mol % of BaO, 15.68 mol % of $Na_2O$, 27.21 mol % of $Fe_2O_3$, 2.30 mol % of CoO, 1.50 mol % of ZnO, and 0.95 mol % of $Nb_2O_5$ were thoroughly dry mixed and then calcined at 740° C. Thereafter, a magnetic powder was obtained by following the procedure of Embodiment 1 while using a temperature of 750° C. for the heat treatment.

The magnetic powder thus obtained was pressed under a load of 400 kgf/cm². The magnetic powder in the compressed state was found to have a packing density of 3.2 g/cm³, a geometric standard deviation of 1.4, a specific surface area of 32 m²/g, a coercive force of 1270 Oe, and a saturation magnetization of 62 emu/g.

COMPARATIVE EXPERIMENT 1

As a starting material, 31.35 mol % of $B_2O_3$, 35.68 mol % of BaO, 1.0 mol % of $K_2O$, 27.33 mol % of $Fe_2O_3$, 2.21 mol % of CoO, 1.50 mol % of ZnO, and 0.93 mol % of $Nb_2O_5$ were thoroughly dry mixed and then calcined at 740° C. Thereafter, a magnetic powder was obtained by following the procedure of Embodiment 1 while using a temperature of 780° C. for the heat treatment.

The produced magnetic powder was pressed under a load of 400 kgf/cm². The magnetic powder in the compressed state was found to have a packing density of 2.3 g/cm³, a geometric standard deviation of 1.48, a specific surface area of 36 m²/g, a coercive force of 1330 Oe, and a saturation magnetization of 61 emu/g.

COMPARATIVE EXPERIMENT 2

As a starting material, 31.35 mol % of $B_2O_3$, 24.68 mol % of BaO, 9.0 mol % of $K_2O$, 1.0 mol % of $V_2O_5$, 27.33 mol % of $Fe_2O_3$, 2.21 mol % of CoO, 1.50 mol % of ZnO, and 0.93 mol % of $Nb_2O_5$ were thoroughly dry mixed and then calcined at 740° C. Thereafter, a magnetic powder was obtained by repeating the procedure of Embodiment 1 while using a temperature of 750° C. for the heat treatment.

The produced magnetic powder was pressed under a load of 400 kgf/cm². The magnetic powder in the compressed state was found to have a packing density of 2.7 g/cm³, a geometric standard deviation of 1.83, a specific surface area of 30 m²/g, a coercive force of 1100 Oe, and a saturation magnetization of 62 emu/g.

COMPARATIVE EXPERIMENT 3

As a starting material, 31.35 mol % of $B_2O_3$, 36.68 mol % of BaO, 27.33 mol % of $Fe_2O_3$, 2.21 mol % of CoO, 1.50 mol % of ZnO, and 0.93 mol % of $Nb_2O_5$ were thoroughly dry mixed and then calcined at 740° C. Thereafter, a magnetic powder was obtained by following the procedure of Embodiment 1 while using a temperature of 780° C. for the heat treatment.

The produced magnetic powder was pressed under a load of 400 kgf/cm². The magnetic powder in the compressed state was found to have a packing density of 2.3 g/cm³, a geometric standard deviation of 1.55, a specific surface area of 33 m²/g, a coercive force of 1250 Oe, and a saturation magnetization of 62 emu/g.

COMPARATIVE EXPERIMENT 4

A magnetic powder was obtained by following the procedure of Embodiment 1 while using a temperature of 780° C. for the heat treatment.

The produced magnetic powder was pressed under a load of 400 kgf/cm². The magnetic powder in the compressed state was found to have a packing density of 3.9 g/cm³, a geometric standard deviation of 1.47, a specific surface area of 17 m²/g, a coercive force of 1220 Oe, and a saturation magnetization of 62 emu/g.

Table 1 shows the characteristics of the magnetic powders obtained as described above.

TABLE 1

| | Packing density g/cm³ | Geometric standard deviation | Specific surface m²/g | Coercive force Oe | Saturation magnetization emu/g |
|---|---|---|---|---|---|
| Example 1 | 2.8 | 1.42 | 37 | 1350 | 60 |
| Example 2 | 3.2 | 1.4 | 32 | 1270 | 62 |
| Comparative Experiment 1 | 2.3 | 1.48 | 36 | 1330 | 61 |
| Comparative Experiment 2 | 2.7 | 1.83 | 30 | 1100 | 62 |
| Comparative Experiment 3 | 2.3 | 1.55 | 33 | 1250 | 62 |
| Comparative Experiment 4 | 3.9 | 1.47 | 17 | 1220 | 62 |

It is noted from Table 1 that the products of Examples 1 and 2 and Comparative Experiments 1, 2, 3 and 4 invariably manifested satisfactory magnetic characteristics, ie. coercive force and saturation magnetization, for magnetic powder. The physical constants of these magnetic powders, however, were fairly different. Though the magnetic powders exhibited resembling numerical values of specific surface area, the products of Comparative Experiments 1 and 3 equally exhibited a compressive property of 2.3, indicating that they were powders not easily compressed. It is further noted that the magnetic powder of Comparative Experiment 2 showed a considerably larger geometric standard deviation as compared with the magnetic powders of the other experiments, indicating that the particles of the magnetic powder possessed dispersed particle diameters.

Magnetic coating materials were prepared in the following fixed composition, using the magnetic powders obtained in the embodiments and the comparative experiments.

| (Composition of coating material) | |
|---|---|
| Magnetic powder | 100 parts by weight |
| Sulfonized vinyl chloride vinyl acetate resin | 7 parts by weight |
| Dispersing agent (lecithin) | 1 part by weight |
| Abrasive ($Al_2O_3$) | 5 parts by weight |
| Lubricant (stearic acid/butyl stearate) | 4 parts by weight |
| Hardening agent (Coronate) | 4 parts by weight |
| Methylethyl ketone | 40 parts by weight |
| Toluene | 30 parts by weight |
| Cyclohexanone | 30 parts by weight |

The ingredients shown above were kneaded with a sand grinder for five hours to obtain a magnetic coating material. This coating material being coated on a polyethylene terephthalate film having a thickness of 9 μm was adjusted so that the thickness of the magnetic layer after drying and calendering became 3 μm. The coated film was dried as exposed meanwhile to a magnetic field of 6 kOe applied to the film perpendicularly to the film surface and then subjected to a calendering treatment, to give rise to a magnetic layer. The coated film was cut into strips 8 mm in width, to form magnetic tapes.

The magnetic tapes thus obtained were tested for saturation magnetization (Ms) and squareness ratio (after compensation of demagnetizing field) in the perpendicular direction by the use of a vibrating sample magnetometer (VSM). The packing property per unit volume of a given magnetic powder was calculated based on the ratio of the saturation magnetization (Ms) per unit volume to the theoretical saturation magnetization (Ms') found by calculation. The theoretical saturation magnetization Ms' of the magnetic powder obtained in Embodiment 1 of this invention, for example, is found to be 172 emu/$cm^3$ based on the composition mentioned above.

Besides the surface property, the magnetic tapes were tested for output in the band of 9 MHz and for noise in the band of 8 MHz.

Table 2 exhibits the properties of magnetic tapes using the magnetic powders of Examples 1 and 2, Comparative Examples 1, 2, 3 and 4.

TABLE 2

Properties of magnetic recording medium

| Magnetic powder of | Surface property (RZ) nm | Perpendicular squareness ratio | Ms' (emu/$cm^3$) | Ms (emu/$cm^3$) | Ms/Ms' (%) | Reproducing output (dB) | Noise (dB) |
|---|---|---|---|---|---|---|---|
| Example 1 | 22 | 0.84 | 172 | 168 | 98 | 2.5 | −0.5 |
| Example 2 | 24 | 0.85 | 177 | 170 | 96 | 2.5 | −0.5 |
| Comparative Experiment 1 | 26 | 0.78 | 175 | 151 | 86 | 0.5 | 0.5 |
| Comparative Experiment 2 | 35 | 0.73 | 177 | 150 | 85 | 0.0 | 2.0 |
| Comparative Experiment 3 | 30 | 0.76 | 177 | 156 | 88 | 0.0 | 0.0 |
| Comparative Experiment 4 | 40 | 0.68 | 177 | 149 | 84 | −2.0 | 3.0 |

It is noted from the embodiments of this invention and the comparative experiments cited above that the magnetic powders of this invention attained high packing in magnetic layer, secured high output, acquired excellent surface property, and attained diminution of noise as compared with the magnetic powders of the comparative experiments.

As a characteristic feature of the embodiments, the fact that the magnetic recording media using the magnetic powders of this invention excelled in packing property and orientation may be cited. As a result, the magnetic recording media allowed perpendicular magnetic recording to be obtained relatively easily.

As described above, the magnetic powder of this invention attains high packing, secures high output, and attain ample diminution of noise as compared with the conventional magnetic powder. Further, the magnetic powder easily attains high orientation as compared with the conventional magnetic powder and, therefore, proves highly effective in exalting recording density.

What is claimed is:

1. A magnetic hexagonal system ferrite powder for use in a high density magnetic recording medium, wherein said magnetic powder, after being packed in a closed container, pressed at a load of 400 kg/$cm^3$, and relieved of the load, exhibits a packing density in the range of 2.5 to 3.5 g/$cm^3$ and a geometric standard deviation of not more than 1.5 in the particle diameter distribution, said magnetic powder being formed by a glass crystallization method using glass components, wherein said glass components include sodium, and said magnetic powder is capable of obtaining a packing ratio of not less than 95% in a magnetic layer of a magnetic recording medium, said packing ratio being a ratio of the saturation magnetization Ms determined per unit volume of said magnetic layer to the theoretical saturation magnetization Ms' based on the same material of said magnetic layer.

2. The magnetic powder according to claim 1, wherein said magnetic powder is a hexagonal system ferrite represented by the formula, $AO \cdot n(Fe_{12-x-y}M1_xM2_yO_{18-\delta})$, wherein A is at least one element selected from the group consisting of Ba, Sr and Ca, M1 is at least one element selected from the group of divalent metallic elements, M2 is at least one element selected from the group consisting of tetravalent to hexavalent metallic elements, and n, x, y, and δ are numbers respectively satisfying the following relationships, $0.8 \leq n \leq 3.0$, $0 \leq x \leq 3$, $0 \leq y \leq 2$, and $\delta = \{x+(3-m)\}/2$, m representing the average valency of the M2 metallic elements.

3. The magnetic powder according to claim 1, wherein said magnetic powder consists essentially of hexagonal system ferrite powder having a specific surface area of 20 to 60 $m^2$/g.

4. The magnetic powder according to claim 3, wherein said specific surface area is in the range of 30 to 50 $m^2$/g.

5. The magnetic powder according to claim 1, wherein said glass components include $B_2O_3$ and $Na_2O$.

6. The magnetic powder according to claim 1, wherein said glass crystallization method comprises the steps of melting said glass components with components of said magnetic powder, rapidly quenching the resulting melt to form an amorphous substance, heat treating the amorphous substance and removing the glass components.

* * * * *